United States Patent
Doerr et al.

(12) 
(10) Patent No.: US 6,235,223 B1
(45) Date of Patent: *May 22, 2001

(54) METHOD FOR PRODUCING A SINTERED NUCLEAR FUEL BODY

(75) Inventors: Wolfgang Doerr, Herzogenaurach; Harald Cura, Erlangen; Gerhard Gradel, Forchheim, all of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,841

(22) Filed: Nov. 4, 1998

Related U.S. Application Data

(62) Division of application No. 08/893,820, filed on Jul. 11, 1997, now Pat. No. 5,894,501.

(30) Foreign Application Priority Data

Jul. 11, 1996 (DE) .............................................. 196 27 806

(51) Int. Cl.$^7$ .................................................. G21C 21/00
(52) U.S. Cl. ......................... 264/0.5; 252/636; 376/409; 376/421
(58) Field of Search ............................. 264/0.5; 252/636; 376/409, 421

(56) References Cited

U.S. PATENT DOCUMENTS

| | | | |
|---|---|---|---|
| 3,375,306 | * 3/1968 | Russell | 264/0.5 |
| 3,504,058 | * 3/1970 | Masselot | 264/0.5 |
| 3,620,720 | 11/1971 | Galmiche et al. . | |
| 3,872,022 | * 3/1975 | De Hollander | 264/0.5 |
| 4,060,497 | 11/1977 | Huschka et al. . | |
| 4,119,563 | 10/1978 | Kadner et al. . | |
| 4,235,563 | 11/1980 | Druckenbrodt et al. . | |
| 4,676,935 | 6/1987 | Funke et al. . | |

FOREIGN PATENT DOCUMENTS 38 02 048 A1   8/1989   (DE) .

OTHER PUBLICATIONS

"Gmelin Manual for Inorganic Chemistry" (Assmann et al.), Springer–Verlag, Berlin–Heidelberg–New York, 1981, pp. 99–115.

"Metallographie" (Schumann), 10$^{th}$ Edition, VEB Deutscher Verlag für Grundstoffindustrie, Leipzig, Germayn, pp. 51–57.

* cited by examiner

Primary Examiner—James Derrington
(74) Attorney, Agent, or Firm—Herbert L. Lerner; Laurence A. Greenberg; Werner H. Stemer

(57) ABSTRACT

A sintered nuclear fuel body includes (U, Pu)O$_2$ mixed crystals having a mean particle size in a range from 7.5 μm to 50 μm. This sintered nuclear fuel body has a high retention capacity for fission gas in a power reactor. In order to produce the sintered nuclear fuel body by sintering a body in a hydrogen-containing sintering atmosphere, a powered substance selected from the group consisting of aluminum oxide, titanium oxide, niobium oxide, chromium oxide, aluminum stearate, aluminum distearate and aluminum tristearate is added to the starting powder for the body. As an alternative or in addition, the body made from the starting powder is sintered during a holding period of 10 minutes to 8 hours at a sintering temperature of 1400° C. to 1800° C. in a hydrogen-containing sintering atmosphere, initially with an oxygen partial pressure of $10^{-10}$ to $10^{-20}$ bar and then from $10^{-8}$ to $10^{-10}$ and then cooled in a hydrogen-containing atmosphere having an oxygen partial pressure of $10^{-10}$ to $10^{-20}$ bar.

29 Claims, No Drawings

US 6,235,223 B1

METHOD FOR PRODUCING A SINTERED NUCLEAR FUEL BODY

This is a division of application Ser. No. 08/893,820 filed Jul. 11, 1997, now U.S. Pat. No. 5,894,501.

BACKGROUND OF THE INVENTION

FIELD OF THE INVENTION

The invention relates to a sintered nuclear fuel body or compact that contains (U, Pu)$O_2$ mixed crystals.

The invention also relates to a method for producing a sintered nuclear fuel body that contains (U, Pu)$O_2$ mixed crystals from powdered starting materials of uranium dioxide $UO_{2+X}$ and plutonium dioxide $PuO_2$, which are ground, compressed into bodies, and sintered as bodies in a hydrogen-containing sintering atmosphere. The variable X is in a range from 0 to 0.3.

One such sintered nuclear fuel body and one such method are known from German Published, Non-Prosecuted Patent Application DE 38 02 048 A1. In that known method, the powdered starting materials of uranium dioxide and plutonium dioxide are ground together with an additive, which is at least one powdered substance selected from the group consisting of ammonium uranyl carbonate, ammonium diuranate, ammonium bicarbonate, zinc stearate, zinc behenate, starch, cellulose, oxalic acid diamide and stearic acid diamide. The powder mixture can be ground and then compressed into tablet-like bodies, which are sintered in a sintering atmosphere of hydrogen.

The sintered nuclear fuel bodies that are obtained are dimensionally stable and also only have slight open porosity, so that gaseous nuclear fission products in a nuclear reactor can be trapped in the sintered nuclear fuel bodies

SUMMARY OF THE INVENTION

It is accordingly an object of the invention to provide a sintered nuclear fuel body and a method for producing a sintered nuclear fuel body, which overcome the hereinaforementioned disadvantages of the heretofore-known products and methods of this general type, which further improve retention of gaseous nuclear fission products and in particular assure the same even if the sintered nuclear fuel bodies are located in a nuclear reactor for long periods of time and output high power.

With the foregoing and other objects in view there is provided, in accordance with the invention, a sintered nuclear fuel body, comprising (U, Pu)$O_2$ mixed crystals having a mean particle size in a range from 7.5 $\mu$m to 50 $\mu$m.

In accordance with another feature of the invention, the (U, Pu)$O_2$ mixed crystals have a mean particle size in a range from 8 $\mu$m to 25 $\mu$m.

This relatively large mean particle size changes only insignificantly during the power output of the sintered nuclear fuel body in a nuclear reactor, so that the gaseous fission products that are produced remain at the site where they were created in the sintered nuclear fuel body and are not released.

The determination of the mean particle size is carried out in accordance with a book by H. Schumann entitled "Metallographie" [Metallography], 10th Edition, VEB Deutscher Verlag fur Grundstoffindustrie, Leipzig, Germany, pp. 51–57.

With the objects of the invention in view, there is also provided a method for producing a sintered nuclear fuel body containing (U, Pu)$O_2$ mixed crystals, which comprises adding at least one powdered substance selected from the group consisting of aluminum oxide, titanium oxide, niobium oxide, chromium oxide, vanadium oxide, aluminum hydroxide, chromium hydroxide, aluminum monostearate, aluminum distearate and aluminum tristearate as an additive to powdered starting materials of uranium dioxide $UO_{2+X}$ and plutonium dioxide $PuO_2$ at least one of before, during and after grinding the starting materials, compressing the ground starting materials into a body, and/or sintering the body during a holding time of 10 minutes to 8 hours at a sintering temperature in a range from 1400° C. to 1800° C. in a hydrogen-containing sintering atmosphere having an oxygen partial pressure of $10^{-10}$ to $10^{-20}$ bar during a first portion of the holding time and having an oxygen partial pressure of $10^{-8}$ to $10^{-10}$ bar during an ensuing second portion of the holding time, and then cooling down the body in a hydrogen-containing atmosphere with an oxygen partial pressure of $10^{-10}$ to $10^{-20}$ bar.

Both the additive and the oxygen partial pressure, especially during the second portion of the holding time, bring about high mobility on the part of uranium, plutonium and oxygen during sintering in the body, thus promoting a uniform, increased particle growth during the sintering of the body.

In accordance with another mode of the invention, there is provided a method which comprises maintaining the sintering temperature at an at least approximately constant value in a range from 1400° C. to 1800° C. This further increases the mobility of uranium, plutonium and oxygen atoms.

In accordance with a further mode of the invention, there is provided a method which comprises heating the body to the sintering temperature in the hydrogen-containing atmosphere having an oxygen partial pressure of $10^{-10}$ to $10^{-20}$ bar. This effects calcination of hydroxides of the additives into oxides, having a crystal lattice structure which is quite similar to the lattice structure of uranium oxide and plutonium oxide, that promotes the formation of (U, Pu)$O_2$ mixed crystals.

In accordance with an added mode of the invention, there is provided a method which comprises maintaining the sintering temperature in a range from 1600° C. to 1800° C. and preferably from 1650° C. to 1750° C.

In accordance with an additional mode of the invention, there is provided a method which comprises heating the body to the sintering temperature in temperature stages.

In accordance with yet another mode of the invention, there is provided a method which comprises providing the hydrogen-containing sintering atmosphere with from 2 to 10 volume % hydrogen and at least one gas selected from the group consisting of noble gas, nitrogen, $CO_2$, CO, $O_2$ and water vapor. This brings about an especially high oxygen partial pressure during sintering.

In accordance with yet a further mode of the invention, there is provided a method which comprises selecting the first portion of the holding time to be in a range from 10 minutes to 4 hours.

In accordance with a concomitant mode of the invention, there is provided a method which comprises selecting the second portion of the holding time to be in a range from 10 minutes to 4 hours and preferably from 2 to 3 hours. These modes bring about a large proportion of the (U, Pu)$O_2$ mixed crystal in the sintered nuclear fuel body.

Other features which are considered as characteristic for the invention are set forth in the appended claims.

Although the invention is illustrated and described herein as embodied in a sintered nuclear fuel body and a method for producing a sintered nuclear fuel body, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific examples.

DESCRIPTION OF THE PREFERRED EMBODIMENTS

The invention and its advantageous will be explained in further detail below in terms of a reference sintered nuclear fuel body or compact, which has been produced approximately in accordance with German Published, Non-Prosecuted Patent Application DE 38 02 048 A1, and for sintered nuclear fuel bodies according to the invention including (U, Pu)$O_2$ mixed crystal:

In order to produce the reference sintered nuclear fuel body, 70 g of $UO_2$ powder and 30 g of $PuO_2$ powder are mixed with 1 g of zinc stearate powder and ground for 16 hours in a ball mill. The ground product is then granulated in a granulating vessel and mixed in a conical mixer with a further 400 g of $UO_2$ powder. Some of this mixed powder is then compressed into a body with a density of from 5.4 g/cm$^3$ to 6.5 g/cm$^3$. This compressed body or compact is sintered in the sintering atmosphere, which includes 4% hydrogen and 96% nitrogen. The natural oxygen impurities in the nitrogen bring about an oxygen partial pressure of $10^{-20}$ atmospheres. After a holding time of 3 hours for the sintering, the sintered nuclear fuel body is cooled down in the sintering atmosphere. The final result is a reference sintered nuclear fuel body with a sintering density that is 95.7% of the theoretical density and an open porosity of 1.9% of the total volume of the reference sintered nuclear fuel body. The (U, Pu)$O_2$ mixed crystal of the reference sintered nuclear fuel body has a mean particle size of 5.1 μm.

In order to produce a first sintered nuclear fuel body according to the invention, the same starting quantities of powdered $UO_2$ and powdered $PuO_2$ as in the production of the reference sintered nuclear fuel body are mixed, but together with one gram of powdered aluminum distearate, and compressed and sintered in the same way as in the production of the reference sintered nuclear fuel body. The result is a first sintered nuclear fuel body according to the invention, having a density of 95.5% of the theoretical density, an open porosity of 1.3% of the total volume of the sintered nuclear fuel body, and a mean particle size of the (U, Pu)$O_2$ mixed crystal of 8.2 μm.

In order to produce a second sintered nuclear fuel body according to the invention, 470 g of powdered $UO_2$, 30 g of powdered $PuO_2$ and 250 ppm of $TiO_2$ are mixed together. The mixture is then ground for 45 minutes in an attritor mill with steel balls. The ground product is then granulated for 20 minutes, and some of this granulated ground product is finally compressed into a body having a density of 5.4 g/cm$^3$ to 6.5 g/cm$^3$. This body is sintered in the same sintering atmosphere and in the same way as the body for producing the reference sintered body. The result is a second sintered nuclear fuel body according to the invention, having a density of 96.3% of the theoretical density, an open porosity of 0.4% of the total volume of the sintered nuclear fuel body, and a mean particle size of the (U, Pu)$O_2$ mixed crystal of 28 μm.

An identical body to that used for making the reference sintered nuclear fuel body is heated in the same sintering atmosphere as in the production of the reference sintered nuclear fuel body to 1750° C. and held at this temperature for one hour. $CO_2$ gas is then added to the sintering atmosphere in increasing amounts until an oxygen partial pressure in the sintering atmosphere of $10^{-8}$ atmospheres is brought about. At the same time, the sintering temperature of 1750° C. is maintained for a further two hours. The feeding of $CO_2$ is then terminated, and the sintered body is cooled down in the hydrogen-containing sintering atmosphere. The result is a third sintered nuclear fuel body according to the invention, having a density of 95.3% of the theoretical density, an open porosity of 0.08% of the total volume of the sintered nuclear fuel body, and a mean particle size of the (U, Pu)$O_2$ mixed crystal of 15 μm.

Finally, an identical body as in the production of the first sintered nuclear fuel body according to the invention is sintered and cooled down in the same sintering atmosphere as in the production of the third sintered nuclear fuel body according to the invention and in the same manner as in the production of this third sintered nuclear fuel body. The result is a fourth sintered nuclear fuel body according to the invention, having a density of 95.2% of the theoretical density, an open porosity of 0.03% of the total volume of the sintered nuclear fuel body, and a mean particle size of the (U, Pu)$O_2$ mixed crystal of 29 μm.

Similarly advantageous values for the density, open porosity and mean particle size of the mixed crystal and therefore a correspondingly good retention capability of the sintered nuclear fuel bodies for gaseous fission products can be attained by the method according to the invention even if the $UO_2$ powder that is used is produced, not by the ammonium uranyl carbonate (AUC) method as is the $UO_2$ powder for the reference sintered nuclear fuel body and the four sintered nuclear fuel bodies according to the invention, but rather by the ammonium diuranate (ADU) method or by dry conversion (see the book entitled "Gmelin Handbuch der Anorganischen Chemie" [Gmelin Manual of Inorganic Chemistry], Springer-Verlag Berlin, Heidelberg, N.Y., 1981; Uran, Ergänzungsband A3 [Uranium, Supplemental Volume A3], pp. 99–115).

Using the four sintered nuclear fuel bodies according to the invention, including (U, Pu)$O_2$ mixed crystal in a high-power nuclear reactor during four usage cycles showed that only about half as much fission gas is released during the four usage cycles, as compared with the reference sintered nuclear fuel body including (U, Pu)$O_2$ mixed crystal.

We claim:

1. A method for producing a sintered nuclear fuel body containing (U, Pu)$O_2$ mixed crystals, which comprises:

adding at least one powdered substance selected from the group consisting of aluminum oxide, titanium oxide, niobium oxide, chromium oxide, vanadium oxide, aluminum hydroxide, chromium hydroxide, aluminum monostearate, aluminum distearate and aluminum tristearate as an additive to powdered starting materials of uranium dioxide $UO_{2+x}$ and plutonium dioxide $PuO_2$;

grinding the starting materials;

compressing the ground starting materials into a body; and sintering the body at a sintering temperature of at least 1400° C. in a hydrogen-containing sintering atmosphere having an oxygen partial pressure of no higher than $10^{-10}$ bar resulting in mixed (U, Pu)$O_2$ crystals having a mean particle size in a range from 7.5 $\mu$m to 50 $\mu$m.

2. A method for producing a sintered nuclear fuel body containing (U, Pu)$O_2$ mixed crystals, which comprises:

grinding powdered starting materials of uranium dioxide $UO_{2+x}$ and plutonium dioxide $PuO_2$;

compressing the ground starting materials into a body;

sintering the body during a holding time of 10 minutes to 8 hours at a sintering temperature in a range from 1400° C. to 1800° C. in a hydrogen-containing sintering atmosphere having a first oxygen partial pressure of $10^{-10}$ to $10^{-20}$ bar during a first portion of the holding time and having a second and higher oxygen partial pressure of $10^{-8}$ to $10^{-10}$ bar during an ensuing second portion of the holding time; and then cooling down the body in a hydrogen-containing atmosphere with an oxygen partial pressure of $10^{-10}$ to $10^{-20}$ bar;

the sintering and cooling resulting in mixed (U. Pu)$O_2$ crystals having a mean particle size in a range from 7.5 $\mu$m to 50 $\mu$m.

3. A method for producing a sintered nuclear fuel body containing (U, Pu)$O_2$ mixed crystals, which comprises:

adding at least one powdered substance selected from the group consisting of aluminum oxide, titanium oxide, niobium oxide, chromium oxide, vanadium oxide, aluminum hydroxide, chromium hydroxide, aluminum monostearate, aluminum distearate and aluminum tristearate as an additive to powdered starting materials of uranium dioxide $UO_{2+x}$ and plutonium dioxide $PuO_2$;

grinding the starting materials;

compressing the ground starting materials into a body; and sintering the body during a holding time of 10 minutes to 8 hours at a sintering temperature in a range from 1400° C. to 1800° C. in a hydrogen-containing sintering atmosphere having a first oxygen partial pressure of $10^{-10}$ to $10^{-20}$ bar during a first portion of the holding time and having a second and higher oxygen partial pressure of $10^{-8}$ to $10^{-10}$ bar during an ensuing second portion of the holding time; and then cooling down the body in a hydrogen-containing atmosphere with an oxygen partial pressure of $10^{-10}$ to $10^{-20}$ bar;

the sintering and cooling resulting in mixed (U, Pu)$O_2$ crystals having a mean particle size in a range from 7.5 $\mu$m to 50 $\mu$m.

4. The method according to claim 1, which comprises adding the at least one powdered substance at an early stage during grinding.

5. The method according to claim 1, which comprises adding the at least one powdered substance at a later stage during grinding.

6. The method according to claim 3, which comprises adding the at least one powdered substance at an early stage during grinding.

7. The method according to claim 3, which comprises adding the at least one powdered substance at a later stage during grinding.

8. The method according to claim 1, which comprises maintaining a sintering temperature at an at least approximately constant value in a range from 1600° C. to 1800° C.

9. The method according to claim 2, which comprises maintaining the sintering temperature at an at least approximately constant value.

10. The method according to claim 3, which comprises maintaining the sintering temperature at an at least approximately constant value.

11. The method according to claim 1, which comprises heating the body to a sintering temperature in the hydrogen-containing atmosphere having an oxygen partial pressure of $10^{-10}$ to $10^{-20}$ bar.

12. The method according to claim 1, which comprises maintaining a sintering temperature in a range from 1600° C. to 1800° C.

13. The method according to claim 2, which comprises maintaining the sintering temperature in a range from 160020 C. to 1800° C.

14. The method according to claim 3, which comprises maintaining the sintering temperature in a range from 1600° C. to 1800° C.

15. The method according to claim 1, which comprises maintaining a sintering temperature in a range from 1650° C. to 1750° C.

16. The method according to claim 2, which comprises maintaining the sintering temperature in a range from 1650° C. to 1750° C.

17. The method according to claim 3, which comprises maintaining the sintering temperature in a range from 1650° C. to 1750° C.

18. The method according to claim 1, which comprises heating the body to a sintering temperature in temperature stages.

19. The method according to claim 2, which comprises heating the body to the sintering temperature in temperature stages.

20. The method according to claim 3, which comprises heating the body to the sintering temperature in temperature stages.

21. The method according to claim 1, which comprises carrying out the sintering in a hydrogen-containing sintering atmosphere containing from 2 to 10 volume % hydrogen and at least one gas selected from the group consisting of noble gas, nitrogen, $CO_2$, CO, $O_2$ and water vapor.

22. The method according to claim 2, which comprises providing the hydrogen-containing sintering atmosphere with from 2 to 10 volume % hydrogen and at least one gas selected from the group consisting of noble gas, nitrogen, $CO_2$, CO, $O_2$ and water vapor.

23. The method according to claim 3, which comprises providing the hydrogen-containing sintering atmosphere with from 2 to 10 volume % hydrogen and at least one gas selected from the group consisting of noble gas, nitrogen, $CO_2$, CO, $O_2$ and water vapor.

24. The method according to claim 2, which comprises selecting the first portion of the holding time to be in a range from 10 minutes to 4 hours.

25. The method according to claim 3, which comprises selecting the first portion of the holding time to be in a range from 10 minutes to 4 hours.

26. The method according to claim 2, which comprises selecting the second portion of the holding time to be in a range from 10 minutes to 4 hours.

27. The method according to claim 3, which comprises selecting the second portion of the holding time to be in a range from 10 minutes to 4 hours.

28. The method according to claim 2, which comprises selecting the second portion of the holding time to be in a range from 2 to 3 hours.

29. The method according to claim 3, which comprises selecting the second portion of the holding time to be in a range from 2 to 3 hours.

* * * * *